US005797570A

United States Patent [19]

Dolan et al.

[11] Patent Number: 5,797,570
[45] Date of Patent: Aug. 25, 1998

[54] PORTABLE DEVICE AND METHOD FOR MOUNTING AN ANTI-GLARE FILTER ON A MONITOR

[75] Inventors: Norman E. Dolan, Santa Rosa; Dean A. Davis, Forestville, both of Calif.

[73] Assignee: Optical Coating Laboratory, Inc., Santa Rosa, Calif.

[21] Appl. No.: 963,263

[22] Filed: Oct. 28, 1997

Related U.S. Application Data

[63] Continuation of Ser. No. 227,965, Sep. 11, 1993, abandoned, which is a continuation of Ser. No. 845,510, Feb. 27, 1992, abandoned, which is a continuation of Ser. No. 657,689, Feb. 15, 1991, abandoned.

[51] Int. Cl.$^6$ ........................................... A47G 1/17
[52] U.S. Cl. ........................ 248/205.3; 248/442.2; 248/918; 359/609
[58] Field of Search ........................ 248/205.3, 918, 248/917, 442.2; 359/601, 608, 609

[56] References Cited

U.S. PATENT DOCUMENTS

| | | |
|---|---|---|
| 3,561,077 | 2/1971 | Grant . |
| 3,823,443 | 7/1974 | Takabayashi . |
| 3,912,140 | 10/1975 | Franges . |
| 4,112,541 | 9/1978 | Tetradis . |
| 4,317,262 | 3/1982 | Wells, Jr. . |
| 4,457,482 | 7/1984 | Kitagawa ........................ 248/74.3 |
| 4,669,688 | 6/1987 | Itoh et al. ........................ 248/74.2 |
| 4,705,249 | 11/1987 | Edwards ........................ 248/101 |
| 4,712,870 | 12/1987 | Robinson et al. ............... 248/918 X |
| 4,807,334 | 2/1989 | Blanchard . |
| 4,811,465 | 3/1989 | Folkmar . |
| 4,815,866 | 3/1989 | Martone . |
| 4,871,264 | 10/1989 | Robbins, III et al. . |
| 4,880,300 | 11/1989 | Payner et al. ................. 248/918 X |
| 4,897,900 | 2/1990 | Baggett . |
| 4,902,078 | 2/1990 | Judd ........................... 248/918 X |
| 4,958,907 | 9/1990 | Davis .......................... 248/918 X |
| 4,983,047 | 1/1991 | Netto . |
| 5,078,358 | 1/1992 | Egly et al. .................... 248/918 X |
| 5,088,667 | 2/1992 | Olson ......................... 248/101 |

OTHER PUBLICATIONS

MISCO Catalog, p. 30, an undated catalog believed to have been issued as early as Apr., 1990.
UARCO Catalog, Fall 1989, p. 43.
MISCO Preview of New Products Catalog, Spring 1990, p. 4C.

*Primary Examiner*—Ramon O. Ramirez
*Attorney, Agent, or Firm*—Workman, Nydegger & Seeley

[57] ABSTRACT

A holder for securely and adjustably supporting an article such as an anti-glare screen on another article such as a display monitor comprises an L-shaped hanger with teeth formed along the first one of its legs. An elongated sleeve having a tooth formed preferably at or near the end thereof is slidably mounted on the first leg. The tooth engages the hanger teeth in a ratchet-type arrangement which permits adjustment of the position of the sleeve on the hanger and thus of the cover on the monitor, while permitting a secure sliding fit between the hanger and the sleeve. Preferably, an adhesive strip secures the sleeve of the hanger to the cover and the second leg is positioned along a top surface of the monitor. Preferably, the underside of the second hanger leg is or is coated with a high friction material which positions the hanger on the monitor, secured against slipping or moving laterally, yet permits ready removal by lifting the hanger upward. The holder can mount the cover at a distance from the display monitor, thus permitting the mounting of flat covers on curved monitors or vice versa. Preferably, a pair of holders is used, mounted on opposite sides of the cover.

18 Claims, 3 Drawing Sheets

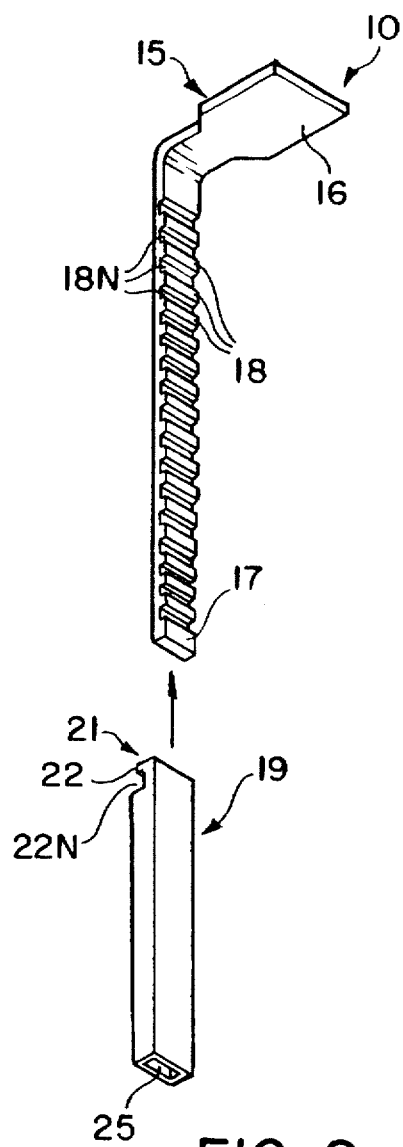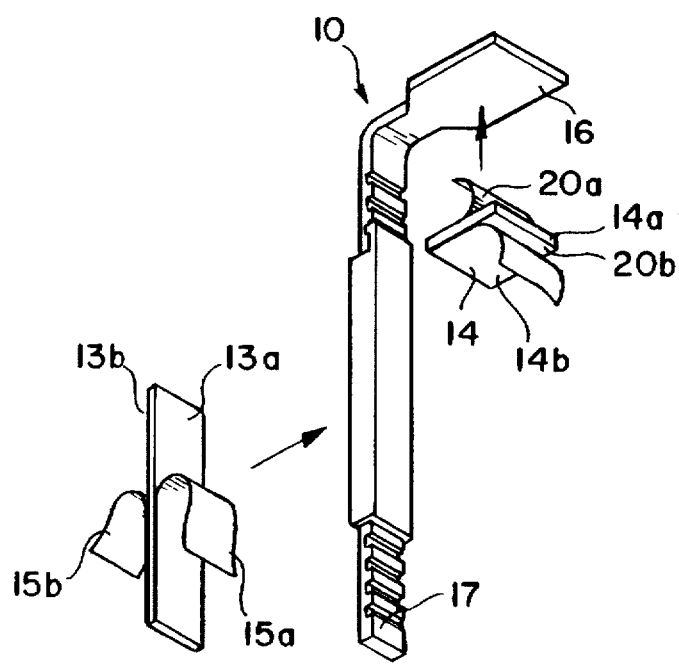

PORTABLE DEVICE AND METHOD FOR MOUNTING AN ANTI-GLARE FILTER ON A MONITOR

This is a continuation of application Ser. No. 08/227,965, filed Sep. 8, 1992, which is a continuation of application Ser. No. 07/845,510, filed Feb. 27, 1992, which is a continuation of application Ser. No. 07/657,689, filed Feb. 15, 1991, now abandoned.

BACKGROUND OF THE INVENTION

1. Field of the Invention

The present invention relates to devices and methods for mounting a first article such as an anti-glare filter or other cover on a second article such as a display or monitor.

2. Description of the Related Art

Devices are available for mounting covers or anti-glare filters on display screens such as computer or TV monitors. However, to my knowledge such devices are not readily adjustable vertically so as to permit easy mounting of a cover of a size which is different from that of the monitor. Furthermore, such holders typically mount the cover flush against the monitor, making it difficult to mount a cover having a contour or shape which is different from that of the monitor.

SUMMARY OF THE INVENTION

1. Objects

In view of the above discussion, it is one object of the present invention to provide a universal, adjustable holder which is suitable for mounting a first article such as a cover or anti-glare filter on a second article such as a display screen or monitor which is of a different size and/or contour.

It is a related object to provide a holder which is portable in that it removably positions or mounts the first article on the second and thus affords complete portability in that the holder and first article are easily and repeatedly transferable from one second article to another (others).

It is another, related object of the present invention to provide such a holder which is strong, durable and of low cost and which can be easily installed and positioned and readily adjusted.

2. Summary

These and other objects are attained in my holder invention for securely supporting a first article such as a cover or anti-glare filter on a second article such as a display screen or monitor and which, in one aspect, is embodied in a holder or hanger comprising a pair of legs forming a generally L-shaped configuration; an elongated sleeve of suitable size and configuration for permitting a sliding fit on a first leg of the hanger; cooperating latching means formed on the first leg and on the sleeve for selectively positioning the sleeve along that leg; means for mounting the sleeve on the first article; and means for securely and removably positioning the second leg on the second article. Preferably two holders are used, which are attached to the rear/monitor side of the filter at the opposite side edges thereof and are positioned/rest on the top of the monitor. Preferably, the means for securely positioning the holder on the monitor is a strip of material which is adhered to the bottom side of the holder and itself has a sticky, high friction material on its bottom side. Preferably, the high friction material is a high density closed cell vinyl foam pad with a high tack, pressure sensitive acrylic adhesive on one side such as 3M Scotchfoam Product, product number 4516.

In a presently preferred embodiment, the cooperating latching means comprises spaced-apart transverse-extending teeth formed on one side of the first leg and a cooperating latch such as a tooth formed proximate or at one end of the sleeve, such that the sleeve latch engages the teeth on the first leg for securely and selectively positioning the slidable sleeve along that leg. The means for mounting the sleeve to the first article preferably is an adhesive strip. Preferably, the adhesive strip is an acrylic closed cell foam coated on both sides with an acrylic adhesive, such as 3M product number 4930. Alternatively, hook- and loop-type fasteners, buttons, snaps, ultra-sonic welding or other suitable joining techniques can be used. The sleeve can be positioned on the first leg with the latch end up or down.

In another aspect, the first leg and the sleeve are of generally rectangular cross-section; the inside dimension of the sleeve is of substantially the same configuration and of slightly larger cross-sectional dimension than the outside of the first leg; and the hanger comprises a flexible material to permit bending of the first leg to facilitate sliding adjustment of the position of the sleeve along the first leg, yet provide secure positioning when the hanger is not being bent.

In still another aspect, my invention is encompassed in a holder which comprises a hanger comprising a pair of legs forming a generally L-shaped configuration, the first leg having spaced-part transverse-extending teeth formed on one side thereof; an elongated sleeve sized and configured to receive the first leg of the hanger and to permit sliding movement along that first leg, the sleeve including a latch such as a tooth proximate or at one end thereof for engaging the teeth on the first leg for securely and selectively positioning the sleeve along the first leg; means for mounting the sleeve on a cover or other first article; and friction means on the second of the legs for securely positioning that leg on top of a monitor or other second article.

In still another, method aspect, my invention relates to positioning an article such as a cover or anti-glare filter article on an article such as a display screen or monitor and comprises providing an L-shaped hanger having a pair of legs and a sleeve adapted for adjustable mounting at selected positions along a first of the legs; mounting the sleeve to the cover; adjusting the position of the sleeve along the first leg to position the cover relative to the monitor; and positioning the second leg on top of the monitor. Also, the position of the cover on the holder can be adjusted while the cover is in position on the monitor.

BRIEF DESCRIPTION OF THE DRAWING

The above and other aspects of the invention are described with respect to the accompanying drawing, in which:

FIG. 2 is an exploded perspective view showing the components of the holder of FIG. 1;

FIG. 5 is an exploded perspective view of a preferred embodiment showing the attachment and positioning of adhesive strips.

DETAILED DESCRIPTION OF THE PREFERRED EMBODIMENT(S)

Figure 1:
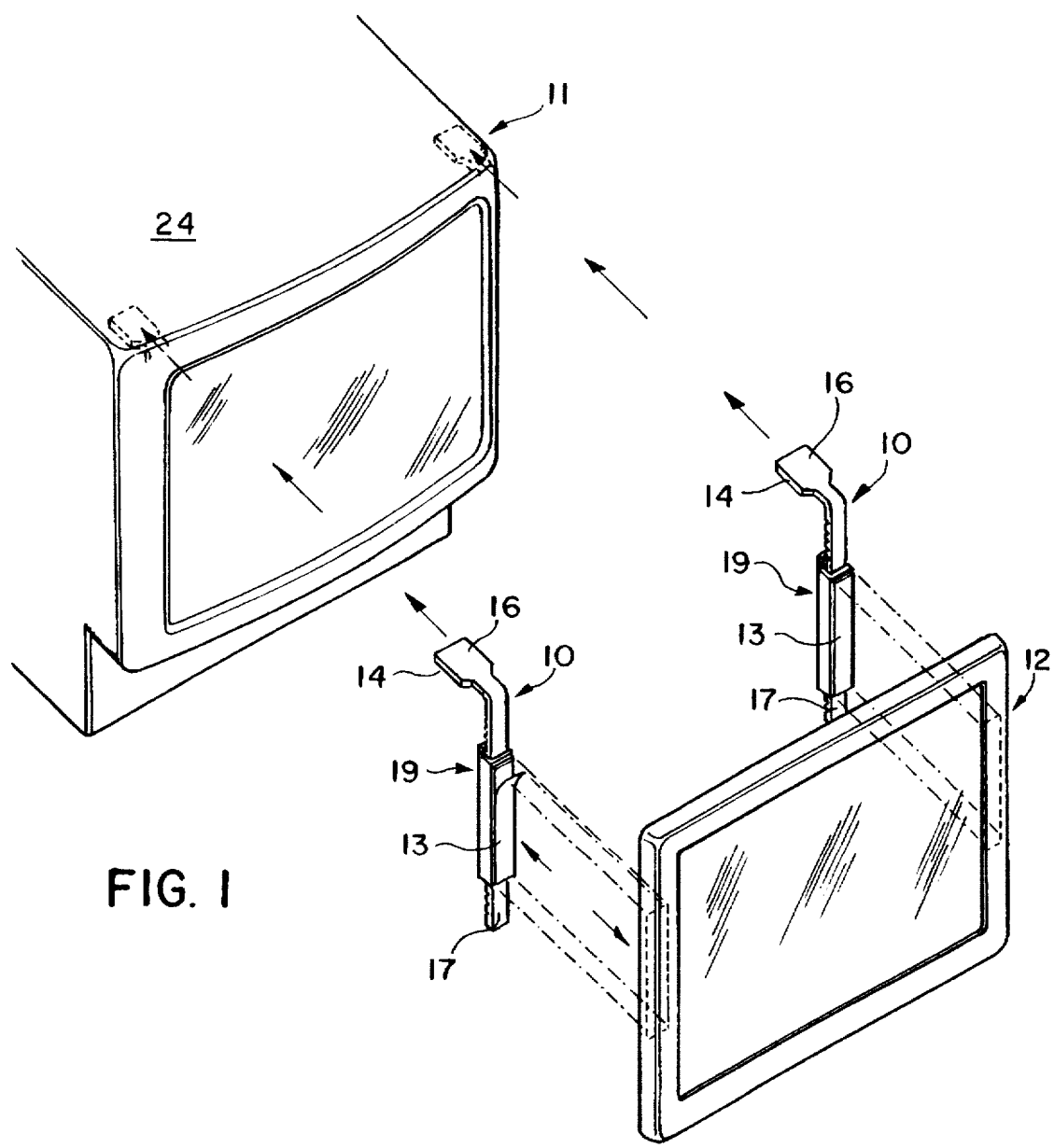
FIG. 1 is an exploded perspective view of a presently preferred embodiment of my hanger or holder, illustrating its use in supporting a cover or anti-glare filter on a display screen or monitor.

FIG. 1 is an exploded perspective view illustrating the use of a holder 10 which embodies my present invention. Preferably, two holders 10 are used to adjustably and removably position a first article 12 such as the illustrated cover or anti-glare filter screen on a second article 11 such as a display screen or monitor. According to the illustrated embodiment, an adhesive strip 13 secures a sleeve 19 of each holder 10 to one of the opposite rear edges of the first article 12, and an adhesive strip 14 is secured to the underside of holder leg 16 for providing secure, frictional contact when the holder leg 16 is positioned on the top surface 24 of the monitor 11 (see also FIG. 4).

Referring to FIG. 2, the holder 10 comprises a hanger and an elongated sleeve 19. The hanger 15 comprises a pair of transverse legs 16 and 17 which form a generally L-shaped configuration. A multiplicity of spaced alternating transverse teeth 18 and notches 18N are formed on the inside surface of a first 17 of the legs. By "transverse", I mean the teeth 18 and notches 18N extend generally transverse to the direction of elongation of the leg 17. Preferably, the hanger 10 is injection molded of a flexible, light weight, acrylonitrile-butadiene-styrene plastic material.

Attached to or formed at one end of the sleeve 19 is a latch in the form of a tab 21 which includes a transverse tooth 22 and notch 22N. The tooth 22 is substantially the same shape as and, preferably, slightly smaller than the between-teeth grooves 18N, FIG. 2, on the leg 17, to provide secure positioning of the sleeve 19 along the leg 17. In addition, the sleeve 19 is sized to provide a stable (wobble-free), yet adjustable sliding fit along the leg 17. Specifically, the internal configuration of sleeve bore 25 (illustratively, the rectangular cross-sectional configuration thereof) is of the same cross-sectional configuration as the leg and has substantially the same internal cross-sectional dimensions as the outside dimensions of the leg (preferably, the internal dimension of the sleeve is slightly larger than the external dimension of the leg).

The latch 21 on the sleeve 19 and the cooperating notches 18N and teeth 18 on the elongated hanger leg 17 comprise effectively a locking ratchet mechanism which permits the sleeve to be mounted on and slidably positioned along the elongated leg 17, then locked into the desired position by engaging the mating ratchet components, i.e., by engaging tooth 22 in a notch 18N between adjacent teeth 18—18.

FIG. 5 illustrates a presently preferred embodiment of my holder 10 and the use of adhesive strips 13 and 14. Both sides or surfaces 13a and 13b of strip 13 and top or outside surface 14a of strip 14 are coated with standard highly adherent adhesive, preferably the acrylic adhesive described previously. "Inside" and "outside" refer to the hanger leg surfaces (and adhesive strip surfaces) which are facing or opposite the monitor 11, respectively. The inside or bottom surface 14b of the strip preferably is of the previously described high-friction, vinyl foam. That is, surface 14b resists sliding movement when hanger 16 rests on top of monitor 11, but is readily lifted off the monitor, for transport to another monitor, for storage, etc. For mounting, protective release strips 13a and 20a are peeled from the adhesive strips 13 and 14 and the exposed strips 13 and 14 are then pressed against the outside or front portion of the vertical sleeve 19 and the inside or bottom portion of the horizontal leg 16, respectively. See also FIG. 1. To complete the mounting, the protective release strip 15b is peeled from the front or outside 13b of the adhesive 13 and the strip is pressed against the first object, here the cover or anti-glare screen 12, to secure the sleeve to the cover. Prior to positioning the cover 12 on the monitor 11 in accordance with FIG. 1, release strip 20b is removed from strip 14. Using two holders mounted on opposite, left and right edges of the cover, the top legs 16—16 of the holders are positioned on top of the monitor 11 with the cover 12 positioned along the front. In this support position, the sticky frictional surfaces 14b–14b retain the holder 10 and the cover 12 against movement along the top surface of the monitor, i.e., in the desired position, but permit ready lift off of the holder for removal or repositioning of the cover.

Figure 3:
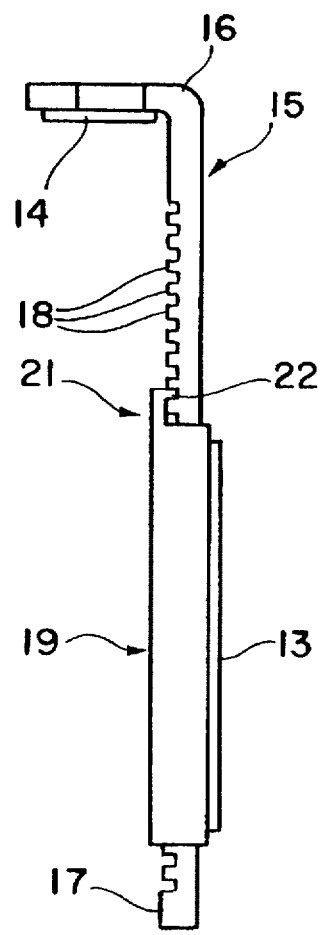
FIGS. 3 and 4 are side elevational views illustrating alternative ways of assembling the holder.

Referring now primarily to FIG. 3 in conjunction with FIG. 1, to mount the sleeve 19 on the hanger 15 or to adjust the position of the sleeve 19 on the hanger 15 prior to or after the holder and cover assembly are positioned on the monitor, the tab 21 is bent outwardly, away from locking engagement with the teeth 18 of leg 17. As a consequence, the sleeve 19 can be slidably inserted over the leg 17 or, if already on the leg, slidably moved along the leg, to the position which provides the desired position of the cover 12 relative to the monitor 11. After the sleeve 19 and attached cover 12 are moved to the desired position, releasing the applied forces results in locking re-engagement of the tab 21 with the teeth 18.

To summarize, a presently preferred approach for mounting the holder 10 and positioning the cover or monitor 12 comprises (1) mounting the holder (preferably a pair of holders) via sleeve 19 to the side(s) of the receiving article such as the anti-glare filter or cover 12; (2) positioning the article 12 in the approximate desired location vis-a-vis the monitor, by resting the leg(s) 16 in the desired location(s) on the top surface of the monitor; and (3) selectively, before, during and/or after the positioning steps, slidably positioning the sleeve 19 along the leg 17 and engaging the ratchet mechanisms to lock the article 12 into position.

Figure 4:
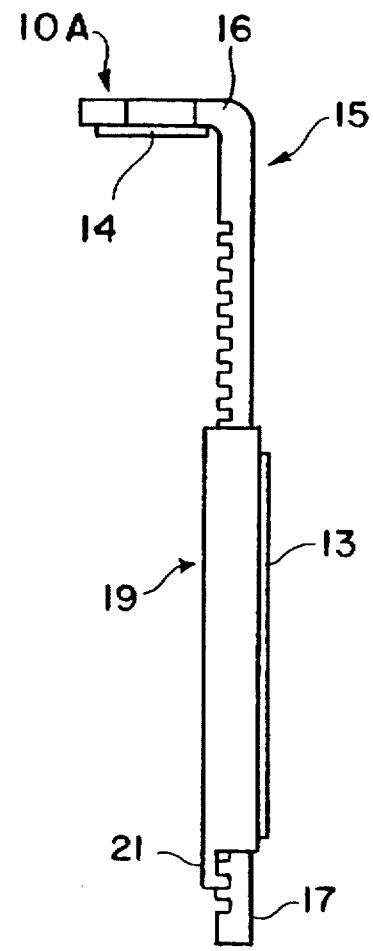

FIG. 4 depicts a preferred holder arrangement 10A for relatively heavy articles 12. Specifically, the sleeve 19 is reversed end for end relative to the orientation shown in FIG. 3, thereby providing additional security against unwanted disengagement of the latch due to the weight of the article 12, at the cost of somewhat lesser ease of adjustment.

As mentioned above, the holder preferably is of injection-molded plastic, which provides light weight, ease of design and fabrication and low cost of manufacturing. Alternatively, the holder may be formed of other suitable light weight, flexible, easily fabricated materials as well. as alluded to above the sleeve 19 and leg 16 preferably are mounted using adhesive strips. However, various other joining techniques and devices can be used, such as hook-and loop-type fasteners, snaps, ultra-sonic bonding, etc.

My above-described holder has a number of advantages over prior art holders. For example, my holder is readily adjustable. The adjustment accommodates objects of a variety of sizes, for example, covers or anti-glare screens 12 and monitors 11 of different sizes. Also, the holder 10 enables one article or object to be mounted onto another without intimate conforming contact between the objects and, thus, can be used to mount objects having different shapes and contours as well as different dimensions. For example, FIG. 1 illustrates mounting a generally flat anti-glare screen 12 onto a monitor 11 having a curved front and screen.

Having thus described preferred and alternative embodiments of my holder, those of usual skill in the art will readily develop additional modifications and embodiments which are within the scope of the appended claims.

We claim:

1. A holder for mounting a first article on a second article, comprising:

a hanger comprising a pair of legs forming a generally L-shaped configuration;

an elongated sleeve sized for a sliding fit along a first one of the legs;

means for securing the sleeve to the first article;

means on the second one of the legs for frictionally engaging the second article to prevent movement of the second leg where resting on the second article; and cooperating latching means formed on the first leg and on the sleeve, comprising spaced-apart transverse-extending teeth on the first leg and a cooperating tooth on the sleeve, whereby the sleeve tooth engages the teeth of the first leg for selectively positioning the sleeve along the first leg.

2. The holder of claim 1, wherein the first leg and the sleeve are of generally rectangular cross-section; the inside dimension of the sleeve is of substantially the same cross-sectional configuration and of slightly larger cross-sectional dimension than the outside of the first leg of the hanger; and the hanger is comprised of a flexible material to permit bending the first leg to facilitate sliding adjustment of the mounting position of the sleeve along the first leg.

3. A holder for mounting a first article on a second article, comprising:

a hanger comprising a pair of legs forming a generally L-shaped configuration;

an elongated sleeve sized for a sliding fit along a first one of the legs, said first leg being resilient for flexing transverse to its length;

means for securing the sleeve to the first article;

means on the second one of the legs for frictionally engaging the second article to prevent movement of the second leg when resting on the second article; and cooperating latching means formed on the first leg and the sleeve for selectively positioning the sleeve along the first leg, said latching means comprising spaced-apart transverse-extending teeth on the first leg and a cooperating tooth on the sleeve, whereby the sleeve tooth engages the teeth of the first leg and is released by bending the first leg for selectively positioning the sleeve along the first leg.

4. The holder of claim 3, wherein the sleeve is positioned on the first leg with the sleeve tooth at the upper end.

5. The holder of claim 3, wherein the means for securing the sleeve comprises adhesive.

6. The holder of claim 3, wherein the means for securing the sleeve comprises a strip having adhesive on opposite sides for adhering to the sleeve and to the first article.

7. The holder of claim 3, wherein the frictional-engaging means comprises a high friction vinyl material with an adhesive on one side which attaches to the underside of the second leg.

8. The holder of claim 3, wherein the sleeve is positioned on the first leg with the sleeve tooth at the lower end.

9. A holder for mounting a first article, such as a cover or an anti-glare filter, on a second article, such as a display screen or monitor, comprising:

a hanger comprising a pair of legs forming a generally L-shaped configuration, the first leg having spaced-apart transversely-extending teeth formed on one side thereof;

an elongated sleeve sized and configured to securely receive the first leg of the hanger and to permit sliding movement thereof along the first leg, the sleeve being of such a length as to provide stable, slidable mounting on the first leg, and including a tab proximate one end thereof having a transverse tooth for engaging the teeth to selectively lock the sleeve at desired positions along the first leg;

means for mounting the sleeve to the first leg; and means on the underside of the second of the legs for frictionally engaging the second article when resting thereon.

10. The holder of claim 9, wherein the sleeve is positioned on the first leg with the tab end thereof uppermost.

11. The holder of claim 9, wherein the sleeve is positioned on the first leg with the tab end thereof lowermost.

12. The holder of claim 9, wherein the means for securing the sleeve comprises an adhesive strip.

13. The holder of claim 9, wherein the means for securing the sleeve comprises a strip having adhesive on opposite sides for adhering to the sleeve and to the first article.

14. The holder of claim 9, wherein the frictionally-engaging means comprises a layer of sticky vinyl material on the underside of the second leg.

15. The holder of claim 14, wherein the sleeve is positioned on the first leg with the tab end thereof uppermost.

16. The holder of claim 14, wherein the sleeve is positioned on the first leg with the tab end thereof lowermost.

17. A method for positioning a first article such a an anti-glare screen or other cover on a second article such an a monitor screen having a top surface, comprising:

providing an L-shaped hanger having a pair of legs and sleeve adapted for adjustable mounting at selected positions along a first one of the legs;

mounting the the first article to the sleeve positioning the first article relative to the second article by resting the second leg on the top surface of the second article; and selectively adjusting the position of the sleeve along the first leg by bending the first leg so the sleeve is disengaged from the first leg, then moving the sleeve along the leg and re-engaging the sleeve.

18. A method for positioning a first article such as an anti-glare screen or other cover on a second article such as a monitor screen having a top surface, comprising:

providing an L-shaped hanger having a pair of legs and a sleeve adapted for mounting on a first one of the legs, the first leg and the sleeve having co-operating latching means comprising a longitudinally-extending array of teeth on the first leg and a co-operating tooth on the sleeve, for adjustably mounting the sleeve on the first one leg;

mounting the the first article to the sleeve;

positioning the first article relative to the second article by resting the second leg on the top surface of the second article; and selectively adjusting the position of the sleeve along the first leg by bending the first leg so the teeth of the first leg and the sleeve disengage from one another, then moving the sleeve along the leg and releasing the first leg, to re-engage the sleeve with the first leg.

* * * * *

UNITED STATES PATENT AND TRADEMARK OFFICE
CERTIFICATE OF CORRECTION

PATENT NO. : 5,797,570
DATED : Aug. 25, 1998
INVENTOR(S) : Norman E. Dolan; Dean A. Davis It is certified that error appears in the above-indentified patent and that said Letters Patent is hereby corrected as shown below:

Cover Page, References Cited, under U.S. Patent Documents please insert the following:

| | | |
|---|---|---|
| 3,189,309 | 6/1965 | Hager |
| 4,577,928 | 3/1986 | Brown |
| 4,632,471 | 12/1986 | Visnapuu |
| 4,834,330 | 5/1989 | Swillinger |
| 4,848,874 | 7/1989 | Mui, et al. |
| 4,864,190 | 9/1989 | Orr |
| 4,946,121 | 8/1990 | Troke |
| 5,069,529 | 12/1991 | Takahashi |
| 5,076,665 | 12/1991 | Petersen |
| 5,082,235 | 1/1992 | Crowther, et al. |
| 5,088,674 | 2/1992 | Prince |

Cover Page, References Cited, under U.S. Patent Documents change "Takabayashi" to --Takabayaski--

Col. 4, line 43, after "as well." insert --Also,--

Signed and Sealed this

Twenty-eighth Day of September, 1999

Attest:

Q. TODD DICKINSON

Attesting Officer     Acting Commissioner of Patents and Trademarks